United States Patent [19]

Ferrieu

[11] 4,187,400
[45] Feb. 5, 1980

[54] TIME-DIVISION MULTIPLEX COMMUNICATION SYSTEM FOR CONNECTING TWO-WIRE LINE CIRCUITS IN TIME-DIVISION MULTIPLEX

[75] Inventor: Gilbert M. M. Ferrieu, Bievres, France

[73] Assignee: Telecommunications Radioelectriques et Telephoniques TRT, Paris, France

[21] Appl. No.: 887,434

[22] Filed: Mar. 16, 1978

[30] Foreign Application Priority Data

Mar. 21, 1977 [FR] France .................. 77 08404

[51] Int. Cl.² ............................................. H04J 3/00
[52] U.S. Cl. ............................ 179/15 AA; 179/15 AT
[58] Field of Search .......... 179/15 A, 15 AA, 15 AT, 179/18 BC, 1 CN, 170 NC

[56] References Cited

U.S. PATENT DOCUMENTS 3,346,697  10/1967  Kitsopoulos ................... 179/15 AA
3,742,147   6/1973  Carbrey ......................... 179/15 AA
3,745,256   7/1973  Carbrey ......................... 179/15 AT Primary Examiner—Bernard Konick
Assistant Examiner—Joseph A. Popek
Attorney, Agent, or Firm—Thomas A. Briody; William J. Streeter; Simon L. Cohen

[57] ABSTRACT

Two time division multiplex switches connected to the ends of a time-division multiplex bus are controlled so that they are closed during a periodically repeated time interval. Connected to the terminals of each two-wire line circuit is a capacitor and a switch, which is synchronously controlled with the time-division multiplex switches so that during each time interval the capacitor is charged to a voltage present on the time-division multiplex bus and that during the successive time intervals the discharge time constant of the capacitor is so long that the voltage of the electrodes of the capacitor remains substantially constant. The voltage is connected across the impedance of the corresponding two-wire line circuit.

5 Claims, 3 Drawing Figures

TIME-DIVISION MULTIPLEX COMMUNICATION SYSTEM FOR CONNECTING TWO-WIRE LINE CIRCUITS IN TIME-DIVISION MULTIPLEX

The invention relates to a time-division multiplex communication system for connecting in time-division multiplex two-wire line circuits via a common time-division multiplex bus comprising time-division multiplex switching means for periodically connecting during a time interval $\tau$ two-wire line circuits to the time-division multiplex bus, each two-wire line circuits comprising a store.

Said communication systems are used in telephony to realize a certain number of simultaneous connections between, for example, two subscriber's stations, between a subscriber's station and a transmission circuit, or between two transmission circuits.

In known time-division multiplex communication systems the transmission path and the receive path are generally separated from one another. Either a spatial separation by means of a hybrid circuit is used or a separation in the time by using separate time intervals $\tau$ for transmission and receipt or a combination of these two possibilities are used. The hybrid circuit for a spatial separation can be realized by means of a push-pull transformer. Furthermore, each two-wire line circuit comprises a capacitor for applying a signal which was applied from another two-wire line circuit to the capacitor via the time-division multiplex bus during the time interval to the two-wire line circuit during the periods of time occurring between the time intervals $\tau$.

A drawback of hybrid circuits is that they introduce an attenuation of 3 dB in the transmission and the receive path and must be perfectly balanced over the entire speech band to avoid across talk.

It is an object of the invention to provide a new, particularly advantageous concept for a system of the type defined in the preamble.

To this end the communication system according to the invention is characterized in that each two-wire circuit comprises a device which, in said time interval, connects the storage elements as well as the two-wire line circuit to a common time-division multiplex bus for storing in the storage elements the values of the relevant signals present at the time-division multiplex bus used simultaneously and in common for transmitting and receiving signals and which connects the storage elements during each period of time situated between two successive time intervals $\tau$ to the two-wire line circuit to which it is applied for applying substantially the same signal value as that stored in the receiving time interval to each two-wire line circuit.

The invention has the advantage that the efficiency of the transmission path is increased by a factor of two whilst retaining the simplicity of the implementation of the communication system. It should here be observed that the practice of simultaneously transmitting in one time interval the signal to be transmitted and to be received via a common-time division multiplex bus is known in itself. However, this refers to communication systems in which the transmission is effected by means of resonance of the transmission path, which requires a special dimensioning of the transmitting medium.

The invention will be further explained with reference to the drawings in which

FIG. 1 shows a communication system in which two two-wire line circuits are connected via a state-of-art time-division multiplex bus, a two-wire-four-wire transition being used for spatially separating the two transmission devices.

Figure 1:
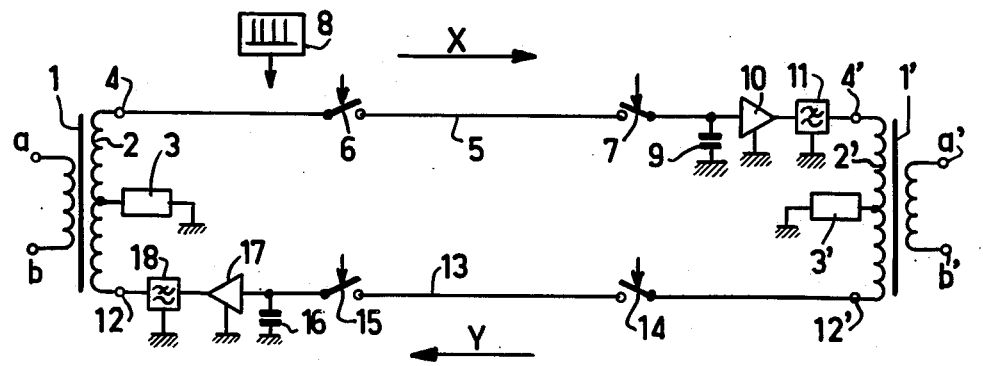
FIG. 1 shows the circuit diagramme of a prior art communication system for connecting two two-wire line circuits in time-division multiplex.

The two wire-line circuits to be connected must be connected to the respective terminals a, b and a', b'. The terminals a, b are connected to a first winding of a transformer 1 whose second winding 2 is provided with a center tap which is connected to a common potential via a balancing impedance 3. The terminals a', b' are connected in the same way to an identical transformer 1', the components of which corresponding to the transformer 1 have been given the same reference numerals provided with an apostrophe.

The corresponding ends 4, 4' of the windings 2, 2' are connected to a time-division multiplex bus 5 via time-division multiplex switching means. These switching means comprise the switches 6 and 7. The switches 6 and 7 are controlled by pulses supplied by a generator 8 for closing switches 6, 7 during time intervals $\tau$ which are periodically repeated with a frequency 1/T, where T is the period of the multiplex frame. Provided between the switch 7 and the end 4' of the winding 2' there are, in this sequence, a store in the form of a capacitor 9 connected between switch 7 and the common potential, an amplifier 10, and a low-pass filter 11. The other ends 12', 12 of windings 2', 2 are connected in a similar manner to a time-division multiplex bus 13 via switches 14, 15 which are controlled in the same manner as the switches 6, 7. A store in the form of a capacitor 16, an amplifier 17 and a low-pass filter 18 are provided between the switch 15 and the end 12 of the winding 2.

By means of this system, the two-wire line circuits connected between the connecting terminals a, b and a', b' are interconnected during the time intervals $\tau$ which are periodically repeated with a repetition rate T via the time-division multiplex bus 5 for a given transmission direction X and via the time-division multiplex bus 13 for the other transmission direction Y. The circuits constituted by the components 9, 10, 11 and 16, 17, 18 convert in known manner the speech signal samples transmitted via the time-division multiplex buses 5 and 13 into a continuous speech signal. During the periods of time situated between two successive time intervals $\tau$ other pairs of two-wire line circuits are through-connected in the same manner via the same time-division multiplex buses 13 and 5.

Such a communication system has the drawback that a very good balance control is required over the entire speech band for the transformers 1, 1' by means of balancing impedances 3, 3', in order to prevent oscillations in the loop which is closed during the time intervals $\tau$ by means of the switches 6, 7, 14 and 15. Furthermore, each of the transformers 1 and 1' and the balancing impedances 3, 3' causes a loss of at least 3 dB, which must be compensated by the amplifiers 10, 17.

The invention provides a time-division multiplex communication system in which the two-wire line circuits are through-connected without the necessity of separating the two transmission devices.

Figure 2:
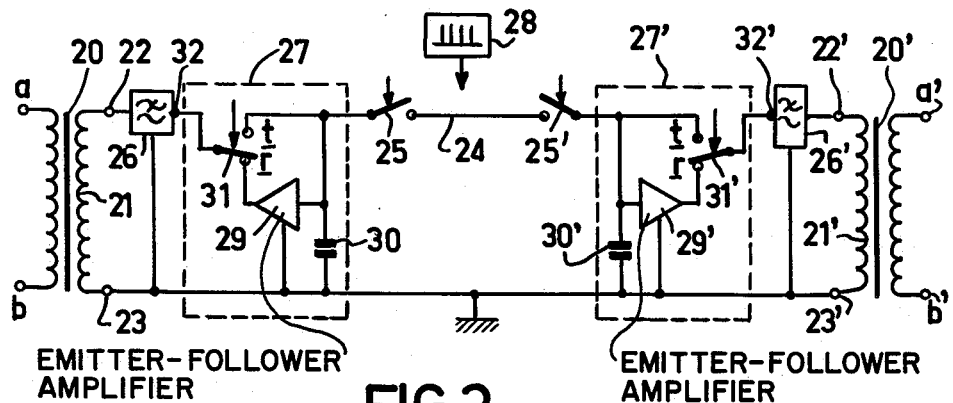
FIG. 2 shows an embodiment of a communication system of connecting two two-wire line circuits in time-division multiplex in accordance with the invention.

FIG. 2 shows an embodiment according to the invention in which two two-wire line circuits must be connected to the respective terminals a, b and a', b'. To insulate the two-wire line circuits to be through-connected from a common potential, for example ground, transformers 20 and 20' are used whose first windings are connected to the respective terminals a, b and a', b'. The transformers 20 and 20' are identical and comprise second windings 21 and 21' having a transformation ratio of, for example, one to one. The ends 23 and 23' of these second windings are interconnected via a common lead and also connected to ground. The other ends 22 and 22' are connected to a time-division multiplex bus 24 by means of switches 25, 25' via low-pass filters 26, 26' and devices 27, 27'. Switches 25, 25' are controlled by pulses from generator 28. Under the control of these pulses the switches 25, 25' are closed during the time intervals τ which are periodically repeated with a period D and the switches 25, 25' are open for the rest of the time.

Said devices 27 and 27' are identical and comprise components which are denoted by means of the same reference numerals provided, however, with an apostrophe for the components of the device 27'. As shown in FIG. 2, the device 27 comprises a store (30, 29) comprising an amplifier 29, the gain coefficient of which is approximately equal to unity and which has a high input impedance, and a capacitor 30. This capacitor 30 of a small capacitance is connected to the input of the amplifier 29 (for example an emitter-follower circuit) and to the switch 25. Furthermore, the device 27 comprises a switch 31 which has two different positions r and t and which is also controlled by pulses of generator 28 in the position t during the time intervals τ in which the switches 25, 25' are closed and in the position r for the rest of the time. If switch 31 is its position t, terminal 32 of a low-pass filter 26 is connected to the switch 25; if, on the contrary, said switch 31 is in its position r, terminal 32 is connected to the output of the amplifier 29. The other terminal of the low-pass filter 26 is connected to the ends 22 of the winding 21. The low-pass filter 26 has a very small attenuation for speech currents supplied to the filter via winding 21, but a very high attenuation relative to the pulse repetition rate 1/T applied to the terminal 32 of the filter. The device 27' is connected in the same manner to the switch 25' and the terminal 32' of the filter 26'.

The system shown in FIG. 2 operates as follows, it being assumed that only speech signals are supplied by the two-wire line circuit connected to the terminals a, b. During each time interval τ in which the two switches 25 and 25' are closed and in which the two switches 31 and 31' are simultaneously in their position t, the two capacitors 30 and 31' are arranged in parallel with the time-division multiplex bus 24 and the capacitors are charged to the same voltage u corresponding to the voltage occurring between the terminals a, b during said time interval τ. Said voltage u is supplied via the switch 31' in position t to the filter 26' via the terminal 32'. During each time interval T-τ in which the two switches 25, 25' are open and in which the two switches 31 and 31' are simultaneously in their position r, the two capacitors 30 and 30' are no longer interconnected and no longer directly connected to the filters 26 and 26'. Said capacitors can only discharge through the high input impedance of the amplifiers 29 and 29'. If this impedance is sufficiently high, the voltage u occurring at the electrodes of the capacitors 29 and 29' will be retained during the entire time interval T-τ. Said voltage u is supplied to the output of the amplifier 29' across a low impedance, and applied to the terminal 32' of the filter 26' via switch 31' in position r.

It is obvious that when the voltage between the terminals a, b varies, a stepped voltage is obtained at terminal 32' of filter 26', the duration of each step being equal to T; the voltage at each step is equal to the voltage between the terminals a, b present at the different time interval τ and is supplied across a low output impedance.

The stepped voltage is filtered in low-pass filter 26' which supplies a voltage which is an exact copy of the voltage applied to the terminals a, b except for a gain factor k, where $$K = \frac{\sine \frac{\omega}{2} T}{\frac{\omega}{2} T},$$

and ω is the angular frequency of the voltage applied between the terminals a, b. The value 48 kHz may, for example, by chosen for frequency 1/T and it can be computed that the factor k corresponds to a relative attenuation of 0.1 dB of a speech signal having a frequency of 4 KHz, which attenuation is negligible. As the transformation ratio of the transformer 20' is equal to 1, the speech signal occurring between the terminals a', b' is equally strong as the signal applied between the terminals a, b.

The system according to FIG. 2 is implemented in perfect symmetry. It is obvious that the circuit operates in the same manner as described above if a speech signal is present between the terminals a', b', the speech signal also being applied to the terminals a and b. Such a system has a very small attenuation relative to the speech signals. The balance controls which are indispensable for the state-of-the-art system shown in FIG. 1 are no longer required. In addition, oscillations are avoided as, during the time intervals, none of the amplifiers in the connecting path is operative, while during the rest of the time there is no connection between the components 20, 26, 27 and 20', 26', 27'.

As regards the devices 27 and 27', FIG. 2 shows an embodiment with reference to which the invention is explained in detail. Other embodiments are, however, possible. One of the possibilities is to replace the amplifier, functioning as the voltage source in the store, by a current source which applies a signal value in the form of a current in the period of time (T-τ) between each two successive time intervals, which signal value is identical to the signal value stored in the store during the preceding time interval τ to prevent the speech current originating from the subscriber from being interrupted. Replacing a voltage source by a current source is a normal matter for one skilled in the art, whereby parallel arrangements must be translated into series arrangements and low impedance into high impedance etc.

Figure 3:
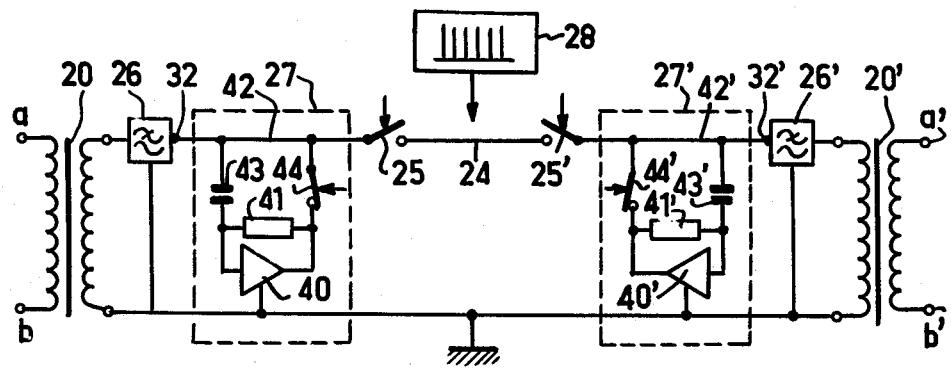
FIG. 3 shows a further embodiment of a communication system according to the invention.

Further, FIG. 3 shows a particularly advantageous embodiment of the devices 27 and 27' which perform the same function as the embodiment in the system of FIG. 2.

With the embodiment, shown in FIG. 3, switches 25 and 25' are connected in a fixed manner to the filters 26 and 26'. The device 27 comprises an inverter amplifier 40 having a high gain factor and a resistor 41 of a high ohmic value, provided between the input and the output of said amplifier. A terminal of this amplifier is connected to the common potential, ground. A capacitor 43 having a small capacitance is provided between the input of the amplifier and the conductor 42 which connects switch 25 to the filter 26. A switch 44 which is controlled so that the operation thereof is inverse to the operation of the switch 25 and 25' is provided between the output of said amplifier and the conductor 42. The device 27' comprises the same components as the device 27 but these components have been given the same reference numerals provided with an apostrophe.

The system of FIG. 3 operates as follows: During each time interval τ in which the switches 25, 25' are closed and in which the switches 44, 44' are open, an electrode of the two capacitors 43, 43' is connected to the time-division multiplex bus 24 while the other electrodes of the two capacitors have substantially the common potential, which is the ground potential, owing to the very low impedance at the inputs of the amplifiers 40, 40' due to feedback resistors 41, 41'. As a result the two low-capacitors 43, 43' are charged during each time interval to the voltage u' present at the time-division multiplex bus 24 and which is substantially equal to the voltage present during this time interval τ between, for example, the terminals a, b. During each time interval T-τ in which the switches 25, 25' are open and the switches 44, 44' closed, the discharge time constant of the capacitors 43, 43' is markedly increased because the amplifiers 40, 40' very slowly discharge the capacitors 43, 43' via the feedback paths formed by the resistors 41, 41'. The voltage u to which the capacitors are charged during each time interval τ is thus maintained during the time interval T-τ and that until the next sampling time interval. So it is obvious that the function performed by the devices 27, 27' of FIG. 3 is the same as that of the devices 27, 27' of FIG. 2, so that the system of FIG. 3 connects the two-wire line circuits connected to the terminals a, b and a', b' in the same manner.

In addition, the circuit of FIG. 3 has the following advantages. FIG. 3 shows that the switches 25, 44 (or 25', 44') have a common terminal; consequently, these switches can be implemented in a very simple manner in the form of a single-pole single throw switch. Futhermore, this switch can be so implemented that no contact is interrupted before the other contact is closed; it is therefore impossible that the capacitors 43, 43' are in an uncertain charge condition during the switching periods. The switches have been shown in the form of contacts. For one skilled in the art it is, however, obvious that these components can be realized by means of semiconductor circuits.

A particularly satisfactory operation of a system having 32 parts of two-wire line circuits was obtained at a sampling frequency $f=48$ kHz. This corresponds to a period T of $\approx 20.8$ μs and a sampling time of $\tau=0.65$ μs. In the circuit according to FIG. 3 the capacitors 43, 43' have, for example, a value of 200 pF, the amplifiers 40, 40', constituted by a Darlington transistor, have, for example, a gain coefficient G=5000 and the ohmic value of the resistors 41 and 41' is, for example, R=1 m Ω. As charging the capacitors 43, 43' is done via the impedance of two-wire line circuits, the impedance having the nominal value $R_1=600$ Ω, the charge time constant of said capacitors is equal to $\theta_1 = R_1 C = 0.12$ μs. As required, said time constant is much shorter than the time interval $\tau=0.65$ μs during which the capacitors are charged. Otherwise it can be proved that in a system according to FIG. 3 the charge time constant $\theta_2$ of the capacitors 43, 43' is approximately equal to $$\theta_2 = C \frac{1}{\frac{1}{R} + \frac{1}{(G+1)} R_1}.$$

For the values indicated above for the components C, R, $R_1$ and G it can be computed that $\theta_2 \approx 150$ μs. At such a discharge time constant of 150 μs it is obvious that the capacitors 43, 43' substantially retain their charge during the time intervals (T-τ) $\approx 20$ μs.

What is claimed is:

1. A time-division multiplex communication system for connecting two-wire line circuits, comprising a single wire two-way time-division multiplex bus, and connecting apparatus comprising a primary switching means for periodically connecting each line circuit to said bus during a predetermined time period of a multiplex frame, storage means responsive to said primary switching means for storing an information signal present on said bus during said predetermined time period, amplifier means connected to said storage means for providing an output signal corresponding to the stored information signal, and secondary switching means operating in sychronization with said primary switching means for disconnecting the output of said amplifier means from an output terminal of said connecting apparatus for the entire predetermined time period and for connecting the output of said amplifier to the output terminal of said connecting apparatus for the remainder of said multiplex frame.

2. A communication system as claimed in claim 1, wherein the storage means comprises a capacitor having a charge time constant which is shorter than the predetermined time period and a discharge time constant which is much longer than the repetition rate of said multiplex frame.

3. A communication system as claimed in claim 2, further comprising a low pass filter, and wherein said amplifier means has a high ohmic input resistance and a low output impedance to whose input the capacitor is connected, and wherein said secondary switching means comprises a further switch means for connecting the capacitor sychronously with the primary switching means to the time-division multiplex bus during the entire predetermined time period and, during the remainder of the multiplex frame, for connecting the output of the amplifier to the output terminal of the connecting apparatus through the low pass filter.

4. A communication system as claimed in claim 2, wherein said amplifier means comprises an inverter amplifier having a large gain coefficient and a large input impedance, a low pass filter, a resistor having a high ohmic value provided between the input terminal and the output terminal of the amplifier, an electrode of the capacitor being connected to the input terminal of the amplifier, and wherein said secondary switch means is connected to the output of the inverter amplifier and, through the low pass filter to the output terminal of the connecting apparatus, the secondary switch means being so controlled sychronously with the time-division multiplex bus that it is open during the entire predetermined time period and closed during the remainder of the multiplex frame.

5. A communication system as claimed in claim 3, wherein the amplifier comprises an emitter follower circuit.

* * * * *